(12) United States Patent
Maxwell et al.

(10) Patent No.: US 6,564,697 B2
(45) Date of Patent: May 20, 2003

(54) TEA BREWING METHOD AND APPARATUS

(75) Inventors: Adrian John Maxwell, Coventry (GB); Charanjit Singh Nandra, London (GB); Miles Pennington, Middleesex (NL); Anthony Edward Quinn, West Sussex (GB)

(73) Assignee: Lipton, division of Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 09/996,101

(22) Filed: Nov. 28, 2001

(65) Prior Publication Data

US 2002/0104442 A1 Aug. 8, 2002

(30) Foreign Application Priority Data

Nov. 30, 2000 (GB) .............................................. 0029228

(51) Int. Cl.[7] ................................................ A47J 31/02
(52) U.S. Cl. ............................ 99/287; 99/299; 99/306
(58) Field of Search ........................ 99/287, 299, 305, 99/304, 307, 306, 297

(56) References Cited

U.S. PATENT DOCUMENTS

| | | | |
|---|---|---|---|
| 2,299,809 A | 10/1942 | Ershler | .................... 99/307 X |
| 4,759,634 A | 7/1988 | Blom | |
| 4,779,520 A | 10/1988 | Hauslein | |
| 4,819,553 A * | 4/1989 | Heyn et al. | .................... 99/305 |
| 4,882,983 A | 11/1989 | Pastrick | |
| 5,927,179 A * | 7/1999 | Mordini et al. | ................ 99/304 |
| 6,279,460 B1 * | 8/2001 | Pope | ........................... 99/299 |
| 6,324,964 B1 | 12/2001 | Niederberger et al. | ........ 99/287 |

FOREIGN PATENT DOCUMENTS

| | | |
|---|---|---|
| EP | 1 020 152 A2 | 7/2000 |
| GB | 3213784 | 11/1983 |
| GB | 2 219 489 A | 4/1988 |
| GB | 2235868 | 3/1991 |

OTHER PUBLICATIONS

Derwent Abstract 1983–789793 of DE 3213784.

* cited by examiner

Primary Examiner—Reginald L. Alexander

(57) ABSTRACT

A machine for brewing tea. The machine has a housing, a vessel for receiving leaf tea and a hot water supply that supplies hot water to that vessel. The leaf tea is physically agitated within the vessel to maximise the rate and extent of infusion and the resulting infusion is siphoned out of the vessel before it is dispensed.

6 Claims, 9 Drawing Sheets

TEA BREWING METHOD AND APPARATUS

FIELD OF THE INVENTION

The present invention relates to an apparatus for brewing infusible plant substances, especially tea.

BACKGROUND AND PRIOR ART

With the exception of water, tea is the most widely consumed of all beverages. Its world-wide per capita consumption has been estimated at 0.1 liter per day. In western countries tea tends to be brewed at home, however, there is a growing trend for consumers to consume tea out of home in cafes and bars. It is thought that consumers prefer to enjoy a tea experience that involves more than being supplied with a tea bag and hot water. There is therefore a need for an alternative brewing method.

Coffee brewing equipment is a familiar feature of cafes and bars. Tea is however much more sensitive to brewing than coffee. Extended steeping in water often ruins the beverage. Too short a steeping time results in too diluted a drink.

Commercial tea brewing machines are known. For example European patent specification EP 1,020,152 A2 (Unilever) discloses a tea brewing machine comprising a housing and at least one brewing assembly. The brewing assembly includes a brewing cup and means for heating the contents of said brewing cup. The brewing cup includes a filter that defines and separates a first cavity within the brewing cup for containing tea leaves and a second cavity within the brewing cup from which tea leaves are excluded. The housing has water supply means for supplying a predetermined volume of water at a temperature that is suitable for infusing tea leaves, a water supply channel for delivering the water into the first cavity of the brewing cup, and a siphon tube that has a siphoning end that extends orthogonally upward into the second cavity of the brewing cup and a downward projecting dispensing end. The arrangement is such that the tea leaves infuse as the water is supplied into the first cavity of the brewing cup, but once the level of infused tea liquor in the second cavity of the brewing cup rises above the siphoning end of the siphon tube the tea liquor siphons down the siphon tube and is dispensed from the dispensing end of the siphon tube.

While such a machine functions well, its many parts make it expensive to manufacture. Water within the machine can cool as it is pumped around the machine to the brewing assembly so the performance of the machine is often determined by how well the contents of the brewing vessel can be heated as the tea is brewing.

It is an object of the present invention to provide a tea brewing apparatus that is suitable for consistently providing individual servings of high quality freshly brewed tea in a busy shop situation.

It is an alternative and more general object of the present invention to provide a brewing machine suitable for brewing tea that is at least a useful alternative to those currently available.

STATEMENT OF THE INVENTION

In broad terms the present invention relates to a tea brewing machine comprising a housing, a vessel for receiving leaf tea, hot water supply means for supplying hot water to the vessel, means for physically agitating the leaf tea within the vessel to maximise the rate and extent of infusion, and a siphon arrangement for siphoning the infusion out of the vessel before it is dispensed.

The leaf tea is preferably agitated by a stirrer or a propeller or by the action of jets of hot water.

The invention can also be said to relate to a mechanised method for brewing tea comprising the steps of loading leaf tea into a vessel, supplying hot water to the vessel to infuse the tea therein, physically agitating the leaf tea within the vessel to maximise the rate and extent of infusion, and siphoning the infused liquid out of the vessel before dispensing it.

"Tea" for the purposes of this invention means leaf material from *Camellia sinensis* var. *sinensis* or *Camellia sinensis* var. *assamica*. It also includes rooibos obtained from *Aspalathus linearis*. "Tea" is also intended to include the product of blending two or more of any of these teas. The leaf material may be substantially fermented i.e. black tea, semi-fermented i.e. oolong tea, or substantially unfermented i.e. green tea. The tea could be a flavoured and/or spiced tea.

"Leaf tea" for the purposes of this invention means a tea product that contains one or more tea origins in a substantially uninfused form.

For the avoidance of doubt, the word "comprising" is intended to mean including but not necessarily "consisting of" or "composed of". In other words, the listed options or steps need not be exhaustive.

All numbers in this description indicating amounts or temperatures of material ought to be understood as modified by the word "about".

DETAILED DESCRIPTION OF THE INVENTION

The present invention concerns a method and apparatus for brewing tea. The apparatus is particularly suited for commercial use in a shop or other out-of-home situation but it need not be used exclusively for that purpose.

The method and apparatus of the invention will be described with reference to four preferred embodiments and the accompanying drawings.

Figure 1:
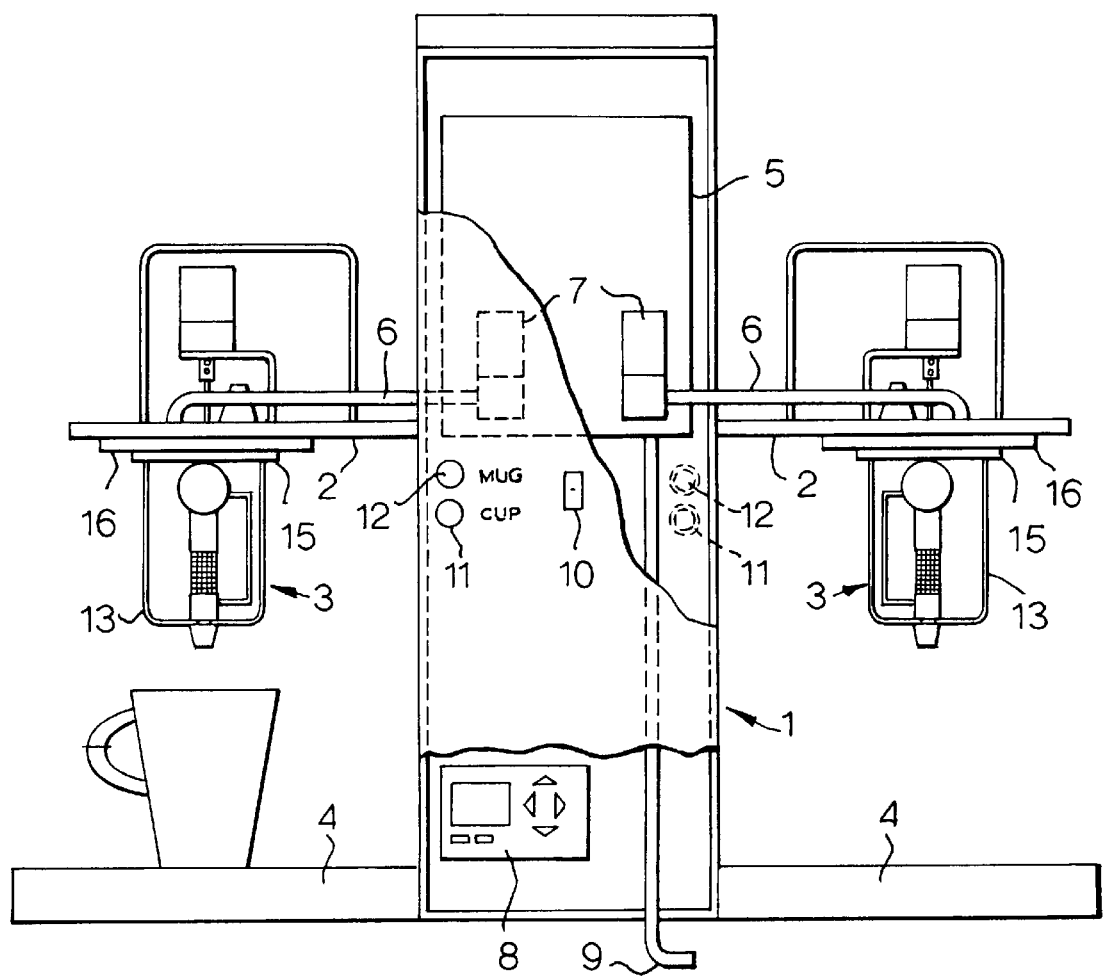
FIG. 1 shows a first preferred embodiment of the tea brewing apparatus of the present invention.

Referring to FIG. 1, the first preferred embodiment of the tea brewing apparatus has a central pedestal 1 with two laterally-projecting arms of shelves 2 for supporting individual brewing vessels 3 (of which in this case there are two but there could be just one or more than two if desired) that are attached to the shelves 2 over respective drip trays 4. The pedestal 1 incorporates an electrically-heated water tank 5 that is located above the shelves 2 for supplying hot water under gravity, or with the aid of a pump (not shown), to each vessel 3 via an individual feed pipe 6. The supply of hot water to each vessel 3 via its pipe 6 is regulated by a respective valve 7 that is controlled from an electronic controller 8 in the pedestal 1. Water from a mains-water supply is fed to the tank 5 via a pipe 9 to maintain a substantially constant water-level in the tank 5 automatically.

The apparatus is powered from the electrical mains, and is switched to an ON condition by manual actuation of a switch 10 on the pedestal 1. Actuation of the switch 10 energises a thermostatically-controlled water-heater (not shown) to bring the water in the tank 5 near-boiling point and to maintain it at that temperature. Once the water is near boiling, operation of the apparatus for brewing tea proceeds according to selection made by an operator. More particularly, the operator may proceed with making tea in just one of the vessels 3, or in both at the same time. The procedure for making tea is the same for each vessel 3 and involves depression by the operator of one or the other of a respective pair of push-buttons 11 and 12 located on the pedestal 1 adjacent the vessel 3 concerned. The push-button 11, which is labelled 'CUP', is depressed where tea of a quantity suitable for a cup is to be made in the respective vessel 3, whereas the pushbutton 12, which is labelled 'MUG', is depressed with a larger quantity suitable for a mug is required.

Figure 2:
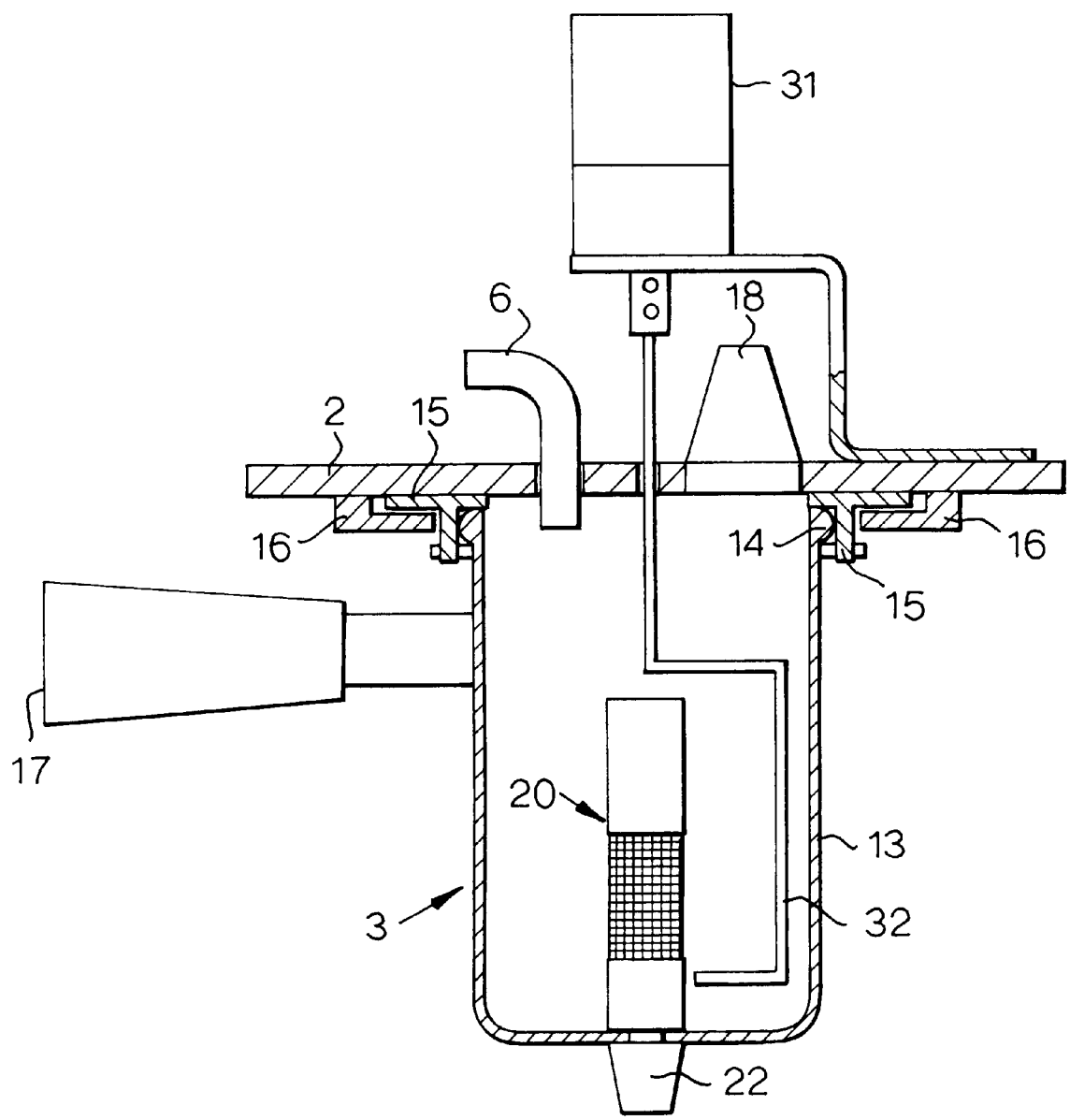
FIG. 2 shows details of a brewing vessel and its mounting in the apparatus of FIG. 1.

Before depressing either push-button 11 or 12, the operator first detaches the relevant vessel 3 from its attachment to the apparatus and measures into it a quantity of leaf tea dependent on whether a cup of mug is involved. As shown more clearly in FIG. 2, each vessel 3 involves a cylindrical container 13, that is preferably made of glass or a heat resistant plastic, and has a rim 14 that is captive within a slotted metal ring 15 at the mouth of the vessel 3. The slotted ring 15 and a slotted metal ring 16 mounted on the underside of the shelf 2 engage with one another in a bayonet connection such that the vessel 3 can be detached from the shelf 2 simply by turning it about its vertical axis to unlock the bayonet connection. A handle 17, which projects radially from the container 13, is provided to facilitate turning and handling of the vessel 3.

The detached vessel 3 is re-attached to the shelf 2 after having been charged with the appropriate quantity of leaf tea. This is accomplished simply by lifting the vessel 3 to bring the ring 15 up underneath the shelf 2 and re-engage with the ring 16. The vessel 3 is then secured by turning it to lock the bayonet connection.

Figure 3:
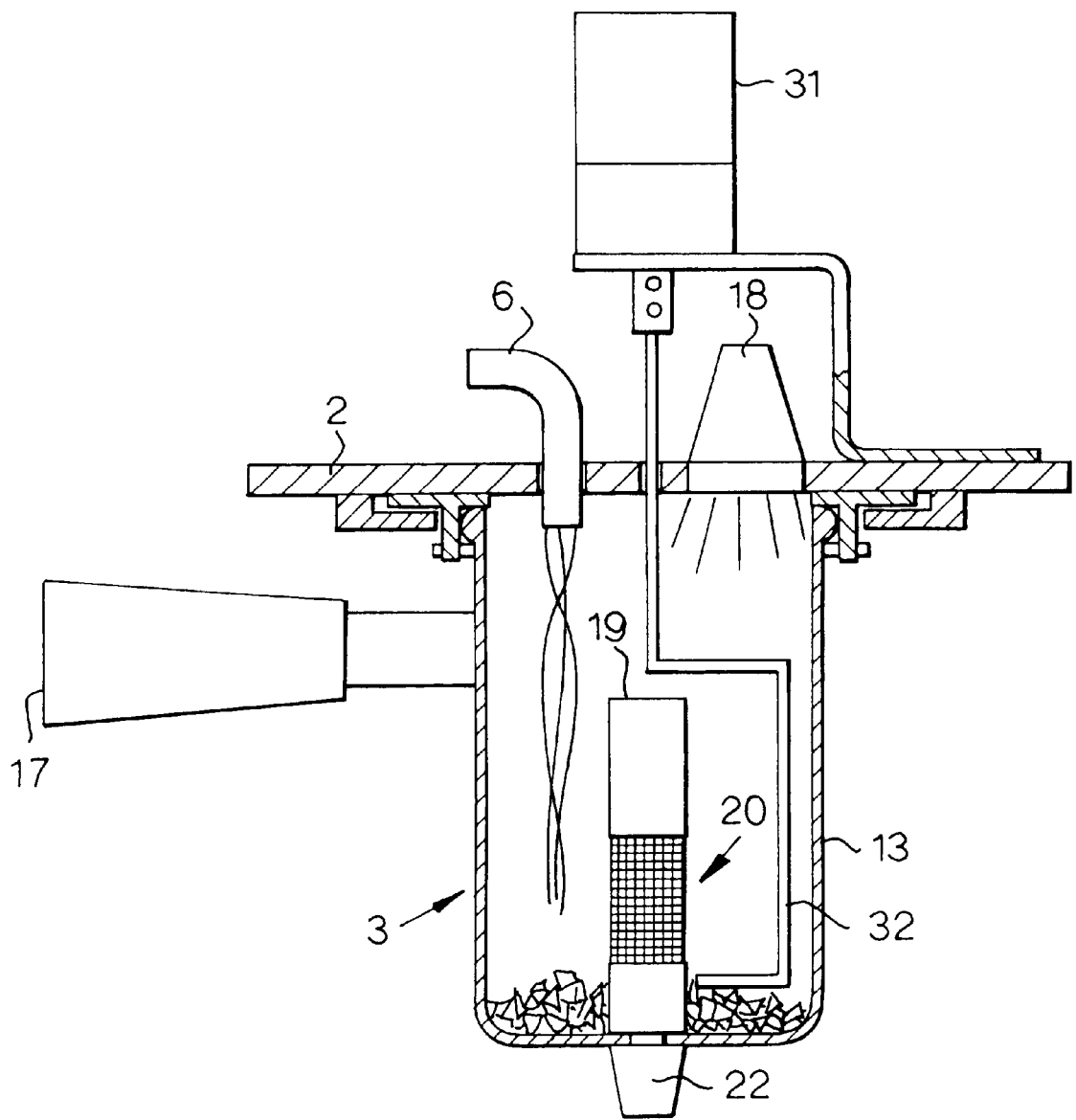
FIG. 3 is illustrative of an early stage in the operation of the tea brewing apparatus of FIG. 1.

Once the vessel 3 has been re-attached, the controller 8 responds to depression of either push-button 11 or 12, to open the respective valve 7 to dispense hot water from the tank 5 into the vessel 3 through its feed pipe 6 and accordingly onto the leaf tea; this is illustrated in FIG. 3. At the same time, an electric lamp 18 that is mounted through the shelf 2 within the ring 16, is energised to illuminate the interior of the container 13 and give emphasis to the entry of the water and the resultant swirling and infusion of the leaf.

The valve 7 remains open only long enough to fill the container 13 to a level somewhat short of the top 19 of a siphon unit 20 that is mounted centrally of the vessel 3. Details of the siphon unit 20 are shown in FIG. 4 and will now be described.

Figure 4:
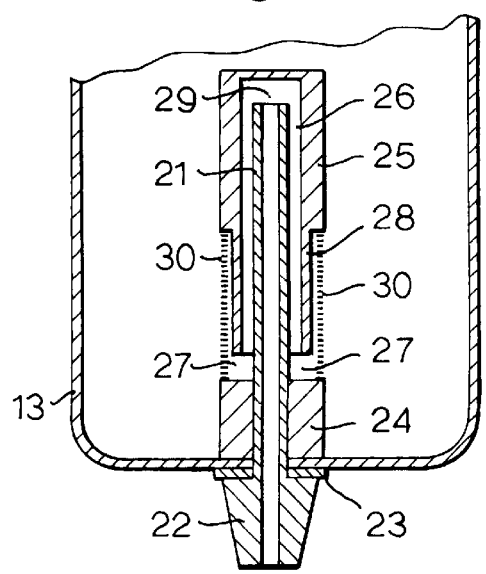
FIG. 4 is a sectional view showing details of a component of the brewing vessel of FIG. 2.

Referring to FIG. 4, the siphon unit 20 has a central tube 21 that projects upwardly from an outlet nozzle 22 through the bottom of the glass container 13. The nozzle 22 is clamped onto a watertight seal 23 on the outside of the glass wall, being held there from the inside by the base 24 of a cylindrical shell 25 which shrouds the tube 21 within the container 13. The shell 25 defines in conjunction with the tube 21 an annular passageway 26 which extends upwardly surrounding the tube 21 from bottom openings 27 that are located within an externally-recessed portion 28 of the shell 25. The passageway 26 runs the length of the tube 21 upwardly from the openings 27 to open into the upper, open end 29 of the tube 21. This establishes a siphonic path that extends from the openings 27, up the passageway 26 into the tube 21 and thence down the tube 21 to the external nozzle 22. A cylindrical member 30 of fine mesh surrounds the portion 28 of the shell 25 to act as a strainer for holding back tea leaf from entering the siphonic path and blocking the openings 27.

Figure 5:
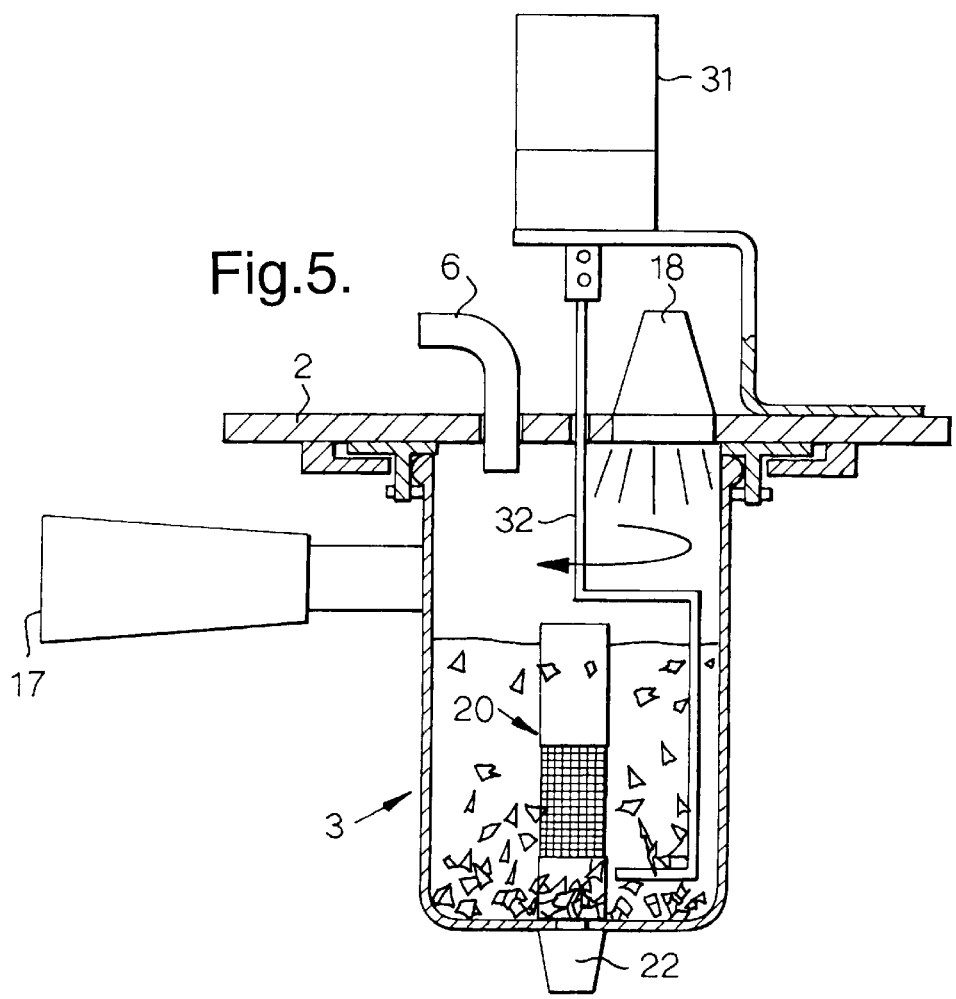
FIGS. 5 and 6 are illustrative of further, successive stages in the operation of the tea brewing apparatus of FIG. 1.

The quantity of water discharged into the container 13 from the feed pipe 6 at the start of operation following depression of either push-button 11 and 12, is insufficient to start siphonic action within the unit 20. The infusion process begun with this discharge of water onto the tea leaf, is enhanced during and after the discharge by stirring, and to this end, an electric motor 31 that is mounted on the shelf 2 is energised by the controller 8 to rotate a stirring rod 32 that hangs down through the shelf 2 into the container 13. FIG. 5 illustrates this stage of operation.

Figure 6:
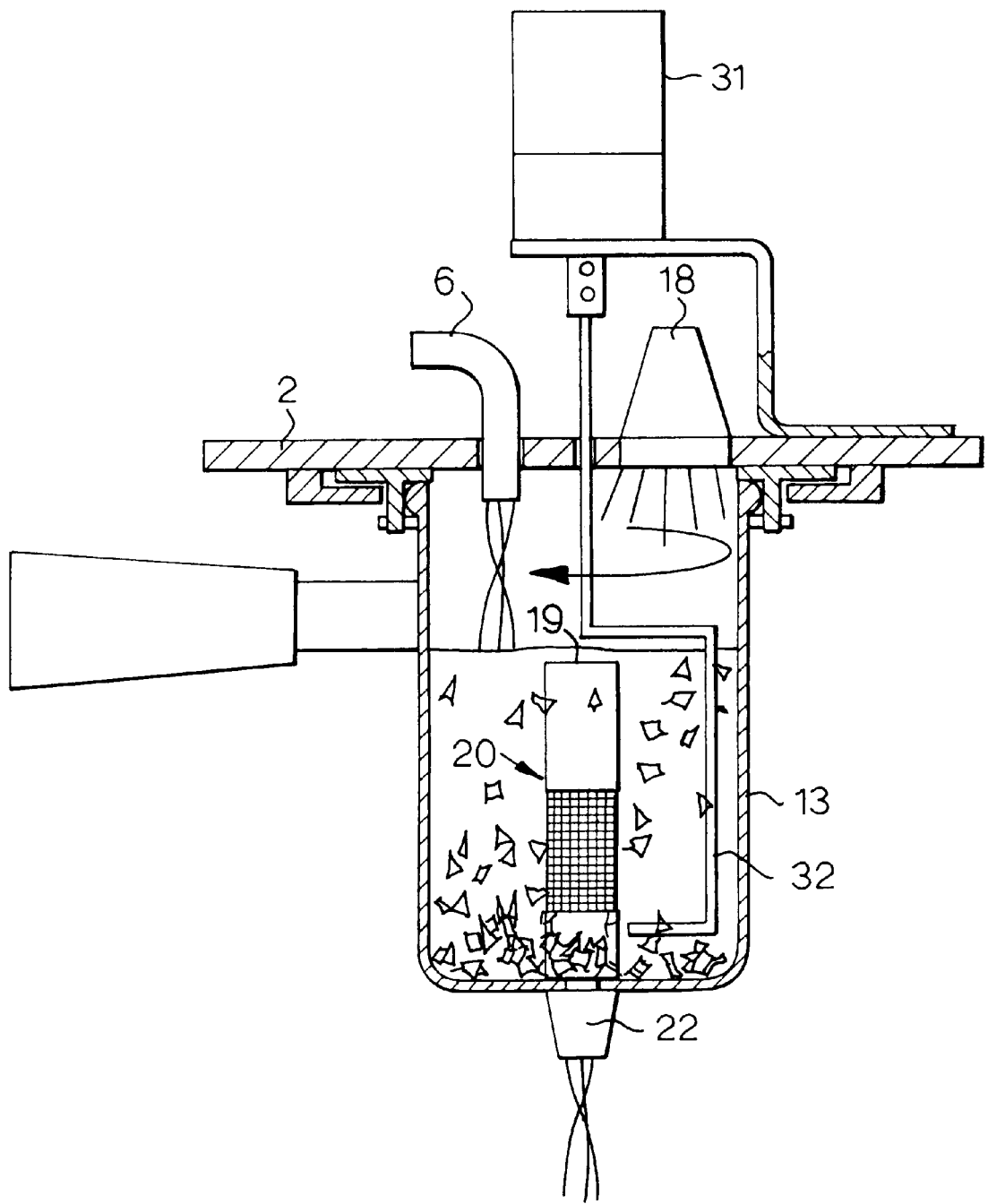

Stirring continues for a period that is pre-set in accordance with the time required for satisfactory brewing of the tea. At the end of this period the controller 8 again opens the valve 7 to discharge hot water into the container 13, as illustrated in FIG. 6. The quantity of hot water discharged into the container 13 this time is dependent on which of the push-buttons 11 and 12 was depressed by the operator. More especially, the amount of water added is sufficient to bring the contents of the container 13 up to what is required to fill either a cup of a mug in accordance with whether it was the push-button 11 or 12 that was depressed at the start.

The addition of water raises the water level within the container 13 to above the top 19 of the unit 20. This consequently initiates siphonic action within the unit 20 by which the brewed tea is drawn off from the container 13 to be discharged through the nozzle 22. The liquid tea is discharged through the nozzle 22. The liquid tea is discharged from the nozzle 22 into an appropriate drinking vessel such as the mug 33 illustrated in FIG. 1, standing on the drip tray 4 below.

The motor 31 continues to be energised to drive the stirring rod 32 throughout, so that the added water is thoroughly mixed with the brewed tea in the liquid siphoned off from container 13. The stirring also disperses the tea leaves within such of the liquid as for the time being remains in the vessel 3, so that they do not clog the mesh-member 30.

The siphonic action continues until the liquid level in the container 13 has fallen almost to the bottom of the mesh-member 30. This level is lower than that which on the face of it is required to maintain the openings 27 covered. This apparent anomaly is believed to result from the tendency of the capillary effect within the mesh-member 30 (and therefore at the openings 27) to a level slightly higher than that outside within the container 13.

The controller 8 continues to energise the motor 31 and the lamp 18 until the liquid tea has been siphoned off. Until then, the illumination provided by the lap 18 or the swirling liquid and tea leaf within the container 13, provides a point of interest and diversion during the tea brewing and dispensing operations. Moreover, the stirring operation speeds infusion and ensures that there is a good and substantially-uniform mix of the product of the infusion, within the water.

Once the liquid tea has been siphoned off, the vessel 3 with the spent tea-leaves and the small quantity of liquid remaining, is removed from the shelf 2 and emptied ready for further use.

Although the use of the apparatus has been described in the context of the operation of just one of the two vessels 3, it will be clear that both may be utilised at the same time as one another.

Figure 7:
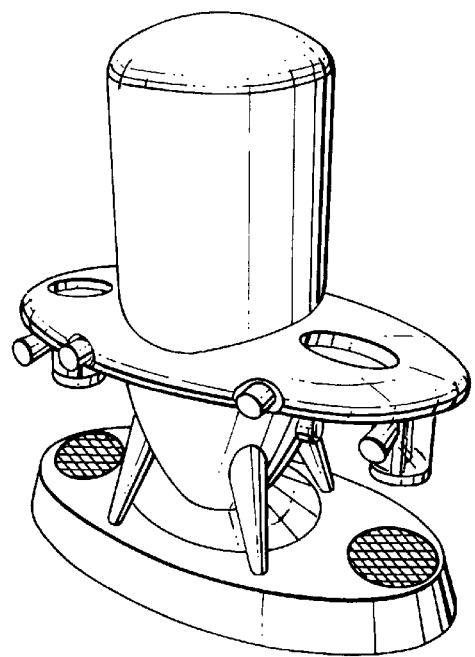
FIG. 7 is a perspective view from the front of a production model of the tea brewing apparatus of the present invention.
Figure 8:
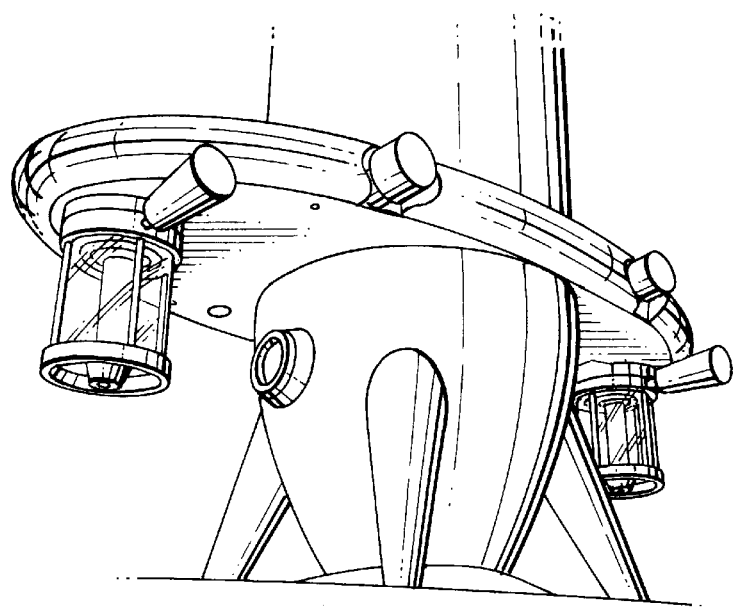
FIG. 8 is a perspective view of the tea brewing apparatus shown in FIG. 7 that shows the vessel in which the leaf tea is brewed in more detail.

A production model of the tea brewing apparatus of the present invention is illustrated in FIGS. 7 and 8. FIG. 7 is a perspective view from the front showing the machine in its entirety. One of the vessels in which the leaf tea is brewed is shown in more detail in FIG. 8.

Three other preferred embodiments of the tea brewing apparatus of the present invention will now be described. They differ from the first embodiment in having alternative means for agitating the tea leaves as they infuse in the brewing vessel.

In a second preferred embodiment of the tea brewing apparatus of the present invention the leaf tea is agitated in the vessel during infusion by a propeller that is attached to rotatable siphon unit.

Figure 9:
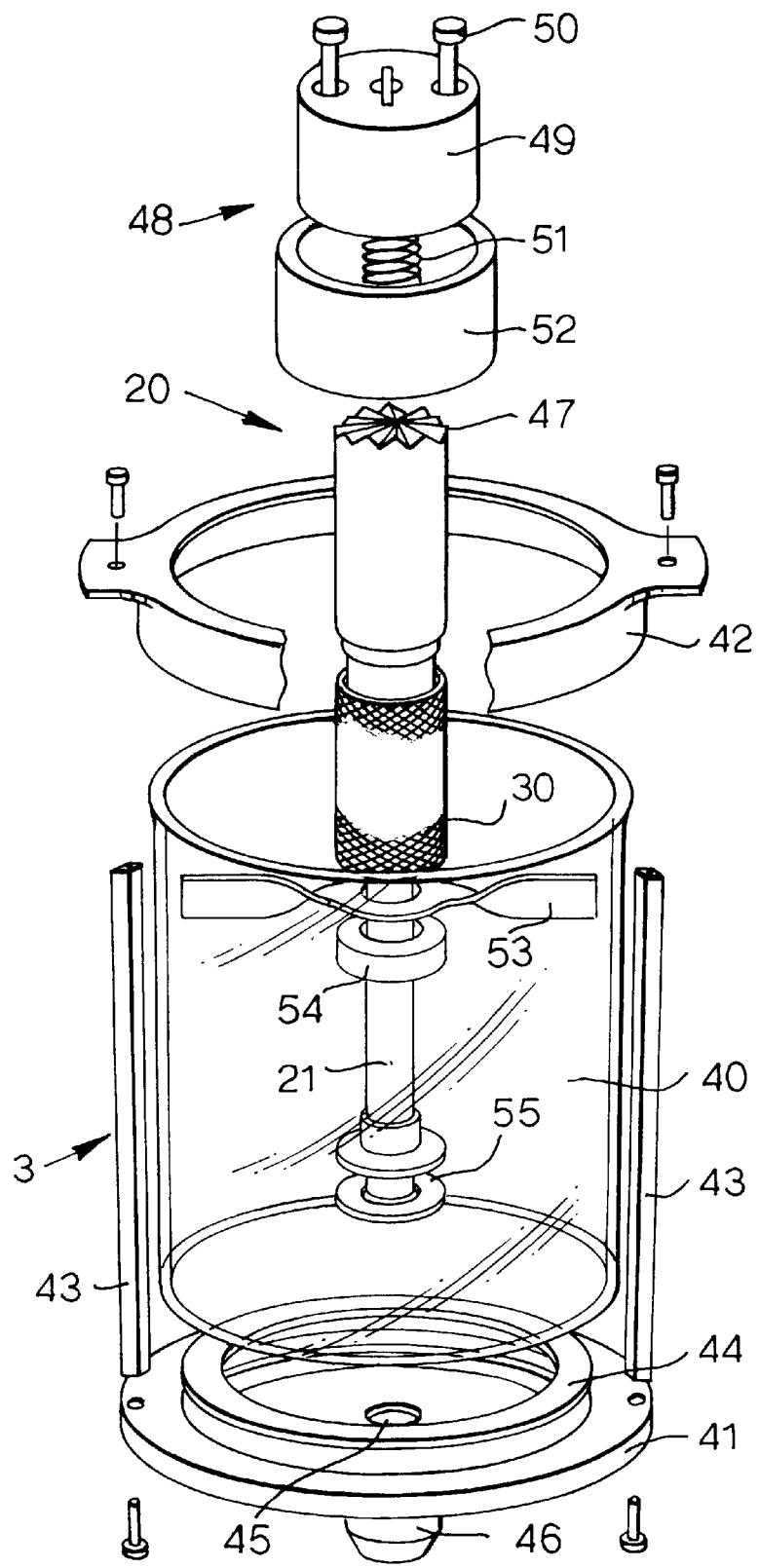
FIG. 9 shows a brewing vessel and siphon arrangement of a second preferred embodiment of the tea brewing apparatus of the present invention that uses a propeller to agitate the tea as it infuses in the brewing vessel.

The brewing vessel and siphon unit arrangement of the second preferred embodiment is shown in an exploded view in FIG. 9.

As seen in FIG. 9, the brewing vessel 3 of the second embodiment comprises a sleeve 40, a base 41 and a top collar 42. The sleeve 40, which is preferably made of glass or a heat resistant plastic, is held between the top collar 42 and the base 41 by two or more tension rods 43. A sealing ring 44 is preferably fitted between the bottom edge of the sleeve 40 and the base 41 to achieve a water-tight seal. The top collar 42 has a bayonet fitting that can be engaged with the slotted metal ring 16 (see FIG. 1) that is mounted on the underside of the shelf 2. The base 41 has a central aperture 45 leading to a nozzle 46. Constructing the brewing vessel 3 in this way provides a vessel that is suitably robust for heavy use in a busy shop environment.

The top of the siphon unit 20 of the second preferred embodiment has a serrated surface 47. The siphon unit 20 is otherwise no different from that shown in detail in FIG. 4. The serrated surface 47 is formed to engage a clutch mechanism 48 for the electric motor 31 (see FIG. 5). The clutch mechanism 48 comprises a clutch body 49, a pair of slider pegs 50, a spring 51 and a clutch cover 52.

A propeller 53 encircles the tube 21 of the siphon unit 20 and is held in place by locking ring 54. The tube 21 protrudes from the bottom of the brewing vessel 3 through the aperture that is formed in the base 41. A seal 55 is provided to ensure a water-tight seal.

In use the motor 31 is activated when hot water has been supplied to the brewing vessel 3. This causes the siphon unit 20 and the propeller 53 to spin rapidly about the tube 21. The spinning propeller 53, and to a lesser the siphon unit 20, can vigorously agitate the tea leaves inside the vessel as they infuse to maximise the rate and extent of infusion. One can control the agitation by controlling and speed and duration of the spinning and by altering the shape, size and configuration of the propeller 53. If desired, the siphon unit can be equipped with fins in addition to, or in place of, the propeller. The infused liquid is siphoned from the brewing vessel in the normal way.

In a third preferred embodiment of the tea brewing apparatus of the present invention the leaf tea is agitated in the vessel during infusion by the action of water jets.

Figure 10:
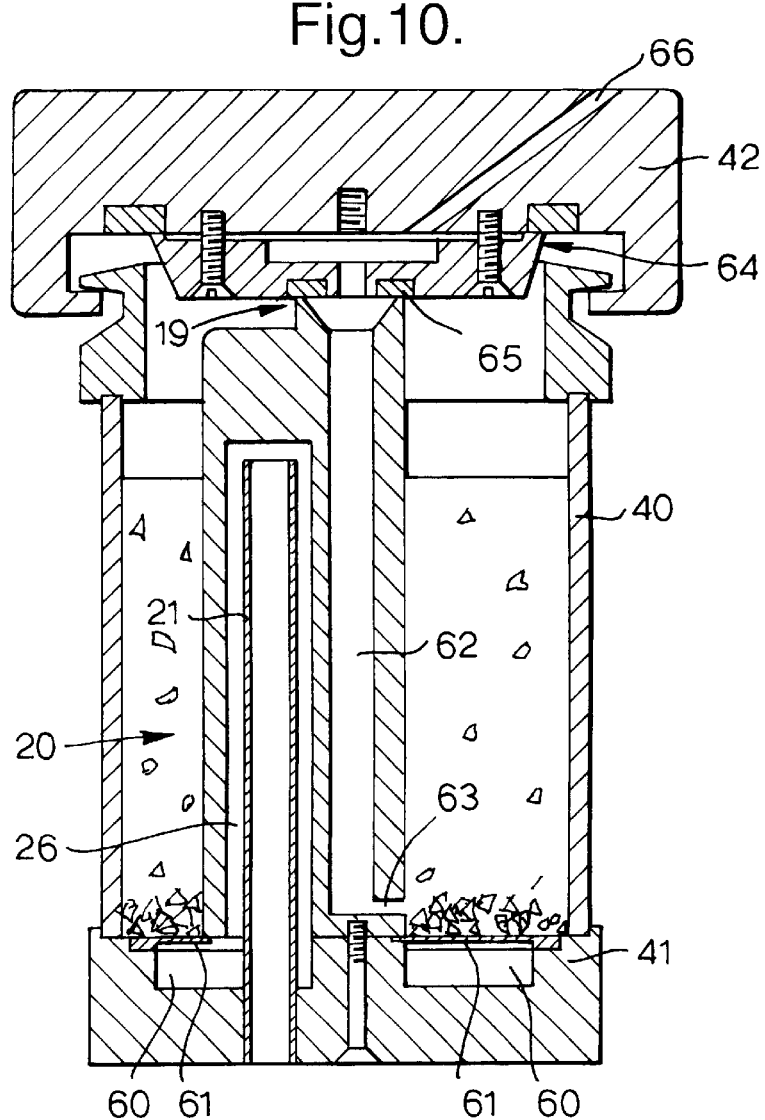
FIG. 10 shows a brewing vessel and siphon arrangement of a third preferred embodiment of the tea brewing apparatus of the present invention that uses water jets that emerge from the base of the siphon unit to agitate the tea as it infuses in the brewing vessel.

The brewing vessel and siphon unit arrangement of the third preferred embodiment is shown in FIG. 10.

As seen in FIG. 10, the brewing vessel 3 of the third embodiment comprises a sleeve 40, a base 41 and a top collar 42. The sleeve 40, which is preferably made of glass or a heat resistant plastic, is held between the top collar 42 and the base 41 by two or more tension rods (not shown). The top collar 42 has a bayonet fitting that can be engaged with the slotted metal ring 16 (see FIG. 2) that is mounted on the underside of the shelf 2 (see FIG. 2).

Unlike the first and second embodiments, the base 41 of the brewing vessel of the third embodiment has an annular recess 60 covered by an mesh disc 61 which act in the same way as the openings 27 and the mesh member 30 respectively that were described with reference to the first embodiment and shown in FIG. 4.

Figure 11:
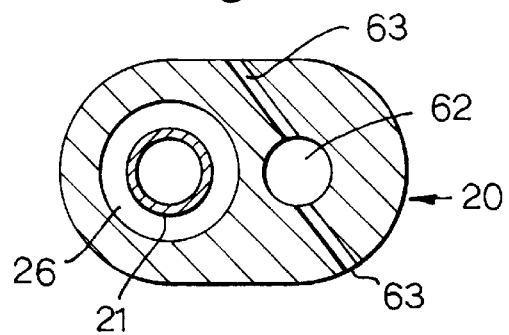
FIG. 11 is a plan view of the siphon unit of the third preferred embodiment shown in FIG. 10.

The siphon unit 20 of the third embodiment has a longitudinal channel 62 that runs from the top 19 of the siphon unit 20 towards its base but exits at the side of the siphon unit 20 adjacent its base through outlets 63. FIG. 11 shows a plan view of the siphon unit 20. There are two outlets 63, one on either side of the siphon unit, however one or three or more outlets could be provided if desired.

A hub 64 is attached to the underside of the slotted metal ring 16 sealing member which is formed to engage with the top 19 of the siphon unit 20. An annular sealing ring 65 is provided in a recess in the underside of the hub 64 to give a water tight seal.

Hot water is pumped or preferably pulsed from the feed pipe 6 (see FIG. 1) through a passage 66 in the slotted metal ring 16 and the hub 64 into the channel 62 and is forced out of the outlets 63 of the siphon unit 20 as jets. These jets of hot water agitate the tea leaves inside the vessel as they infuse to maximise the rate and extent of infusion. The final pulse should be sufficient to bring the contents of the brewing vessel up to the level that is required to initiate the siphonic action within the siphon unit 20 by which the brewed tea is drawn off from the brewing vessel and dispensed (see FIG. 6).

In a fourth preferred embodiment of the tea brewing apparatus of the present invention water jets are directed into the brewing vessel from above to agitate the tea as it infuses in the brewing vessel.

Figure 12:
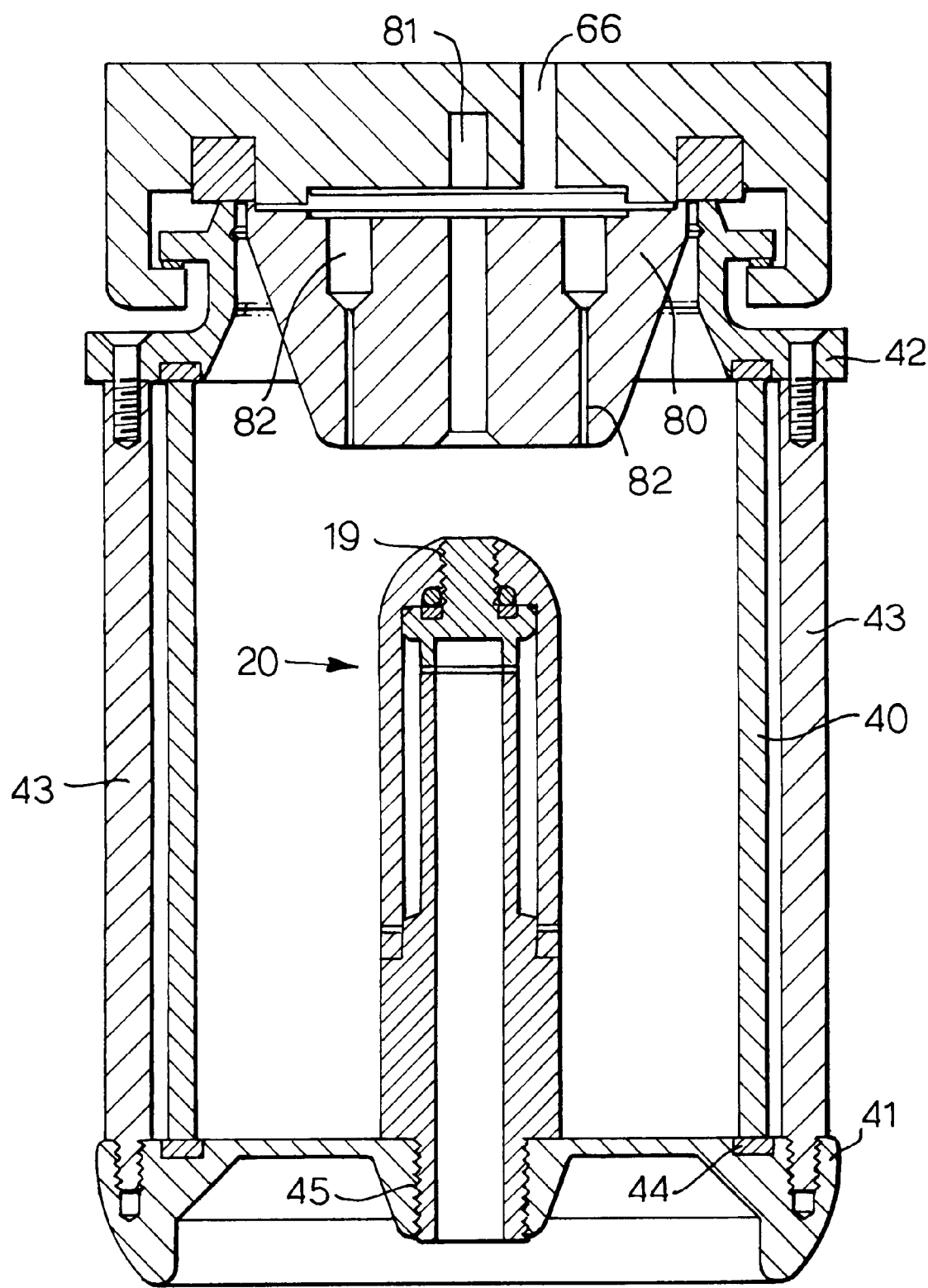
FIG. 12 shows a brewing vessel and siphon arrangement of a fourth preferred embodiment of the tea brewing apparatus of the present invention that uses water jets that are directed into the brewing vessel from above to agitate the tea as it infuses in the brewing vessel.

The brewing vessel and siphon unit arrangement of the fourth preferred embodiment is shown in FIG. 12.

The brewing vessel 3 is similar to that of the second embodiment. It has a sleeve 40, a base 41 and a top collar 42. The sleeve 40, which is preferably made of glass or a heat resistant plastic, is held between the top collar 42 and the base 41 by two or more tension rods 43. A sealing ring 44 is preferably fitted between the bottom edge of the sleeve 40 and the base 41 to achieve a water-tight seal. The top collar 42 has a bayonet fitting that can be engaged with the slotted metal ring 16 (see FIG. 1) that is mounted on the underside of the shelf 2. The base 41 has a central aperture 45, the inner surface of which is threaded. The brewing vessel of this embodiment is robust like that of the second embodiment but it is free standing and thus more convenient use in a busy shop environment.

The siphon unit 20 is essentially the same as that of the first embodiment. The bottom of the siphon unit is however threaded so it can be simply screwed into the base 41 of the brewing vessel 3. And the top 19 of the siphon unit is domed to prevent tea leaves collecting on it.

The major distinguishing feature of the fourth embodiment is the provision of a hub member 80 that is suspended from the lower surface of the slotted metal ring 16 and through which hot water can be forced under pressure as jets. The hub member 80 is preferably frusto-conical in shape. It is preferably made of plastic or some other insulator as metal parts can act as heat sinks. The hub member 80 is secured to the slotted metal ring 16 by a screw 81 and has several water channels 82. The slotted metal ring 16 has a passage 66, which is connected to the feed pipe 6 (see FIG. 1). Hot water from the feed pipe 6 is pumped or pulsed through the passage 66 in the slotted metal ring 16, through the channels 82 in the hub member 80 and into the brewing vessel 3 as water jets. These jets of hot water agitate the tea leaves inside the vessel 3 as they infuse to maximise the rate and extent of infusion. Vents (not shown) are preferably provided in the mouth of the brewing vessel cup through which any steam can escape thus avoiding the build up of pressure. When the brewing vessel contains the volume that is required to initiate the siphonic action within the siphon unit 20 the brewed tea is drawn off from the vessel and dispensed through the nozzle 22 (see FIG. 6).

The pipes are preferably drained between cycles, for example by simply opening a valve provided for that purpose. This avoids water collecting in the pipes, cooling down and lowering the temperature of hot water that is subsequently pumped through them.

For safety reasons water should preferably not be served at a temperature greater than 84 degrees Celsius. Tea should however be infused with freshly boiled water to maximise quality and microbiological kill and minimise infusion time. When using a pressurised boiler the water will often have a temperature above boiling point. In any event, the machine, if desired, can be adapted to supply a small volume of cold (or less than hot) water to the brewed liquor to reduce the temperature prior to serving.

The foregoing description describes a tea brewing apparatus and some preferred embodiments thereof. The preferred embodiments take the form of counter fitted brewing equipment. The tea leaves could be agitated in the brewing vessels using methods other than those described in the preferred embodiments. For example one could bubble air or steam through the infusing liquid or provide means for repeatedly withdrawing and replacing water into the vessel.

The apparatus can be adapted for installation in other retail settings such as kiosks and mobile vending stations including carts. If desired it can be advantageous for the tea brewing apparatus to include a hot water tap for filling tea pots or cafetieres or the like and/or a steam wand.

What is claimed is:

1. A tea brewing machine comprising a housing, a vessel for receiving leaf tea, hot water supply means for supplying hot water to the vessel, means for physically agitating the leaf tea within the vessel to maximise the rate and extent of infusion, and a siphon arrangement for siphoning the infusion out of the vessel before it is dispensed wherein the means for physically agitating the leaf tea within the vessel comprises a stirring device, or jets of water supplied by the hot water supply means which are pumped or pulsed through channels in a hub member located at an upper part of the vessel.

2. A machine according to claim 1 wherein the vessel includes means that supply jets of air or water into the vessel to physically agitate the leaf tea within the vessel.

3. A machine according to claim 1 wherein the siphoning arrangement comprises a siphon unit that projects from the base of the vessel, said siphon unit having at least one opening located adjacent the base of the vessel that leads into passageway that extends up the siphon unit and into a siphon tube that extends down through the siphon unit and terminates at a nozzle that projects below the base of the vessel.

4. A machine according to claim 3 wherein filter means is provided over the opening or openings of the siphon unit.

5. A machine according to claim 1 wherein at least a portion of the siphon unit is rotatably mounted on the base of the vessel, said rotatable portion being provided with fins or a propeller that agitates the leaf tea while it is infusing.

6. A machine according to claim 1 wherein water is supplied into the vessel via a channel that passes through the siphon unit.

* * * * *